Feb. 6, 1940.  E. L. MAYO  2,189,348
HEATING AND VENTILATING SYSTEM
Filed Jan. 6, 1938  4 Sheets-Sheet 3

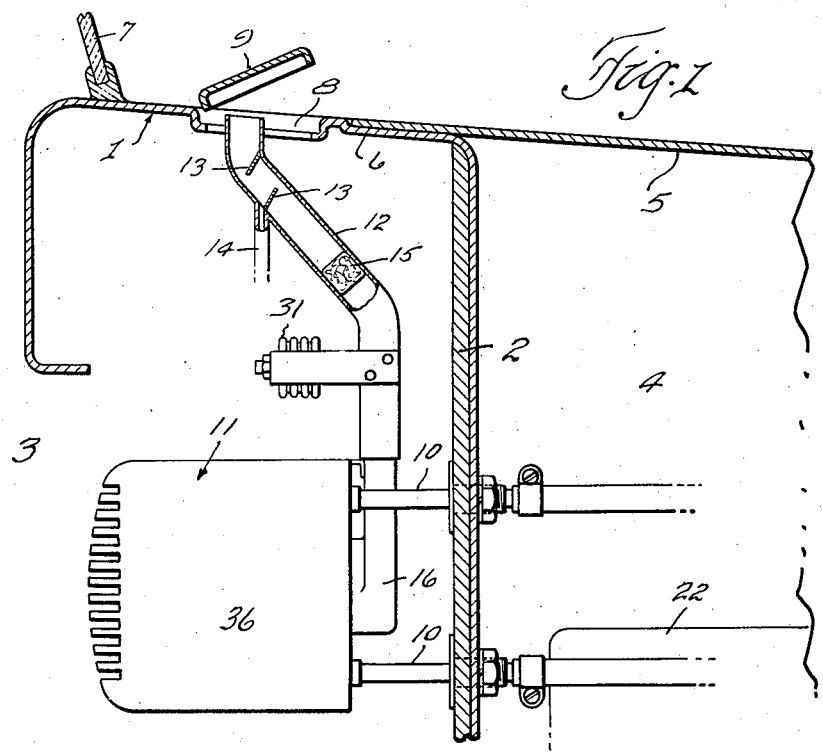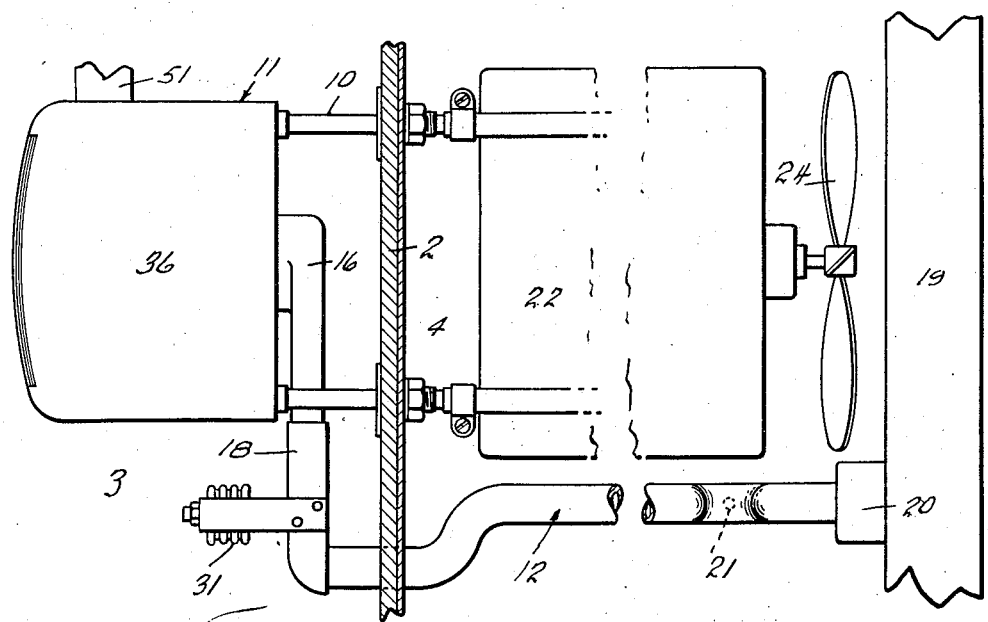

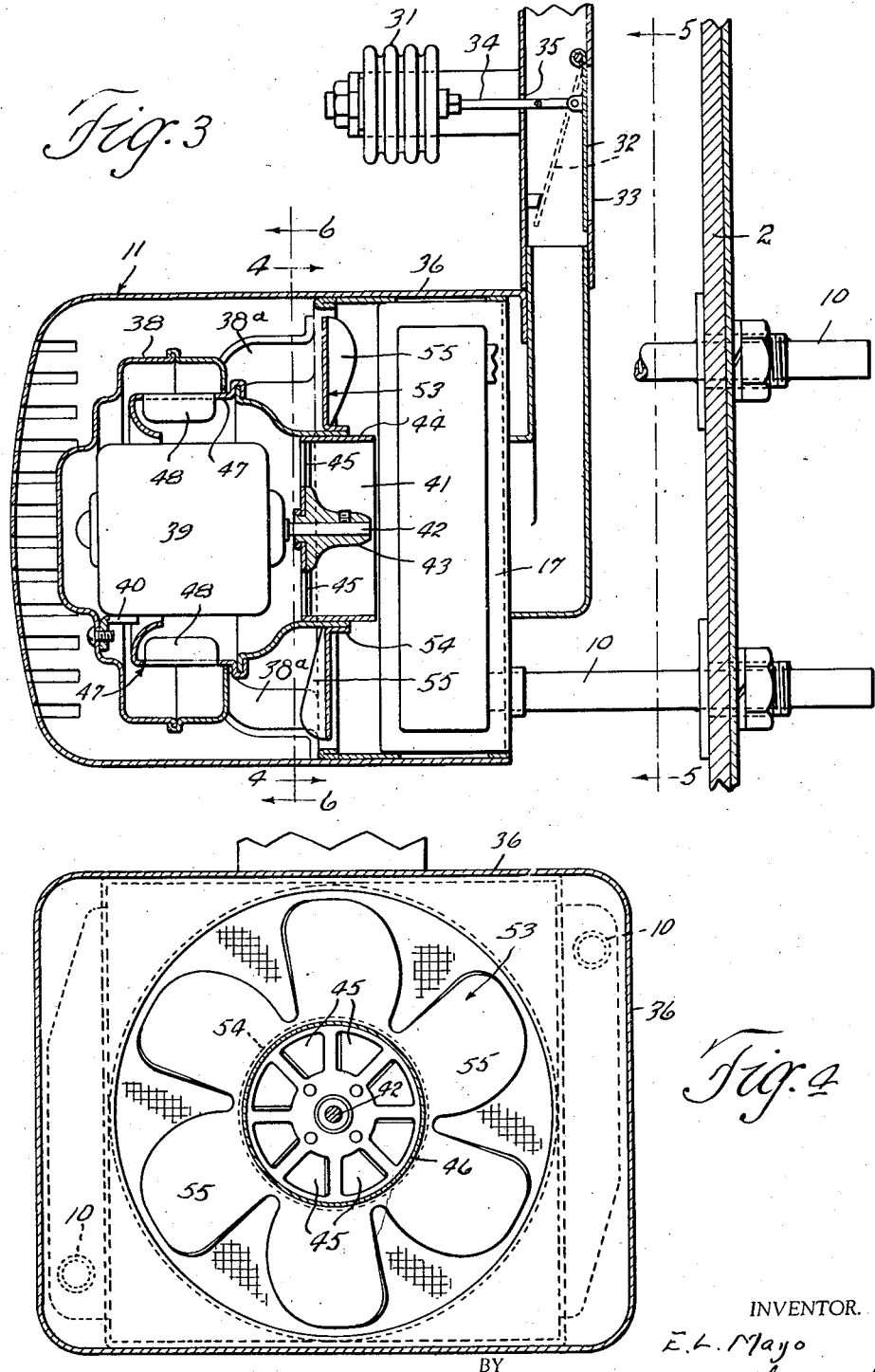

INVENTOR.
E. L. Mayo
BY Hull Brock West
ATTORNEY.

Feb. 6, 1940.  E. L. MAYO  2,189,348
HEATING AND VENTILATING SYSTEM
Filed Jan. 6, 1938  4 Sheets—Sheet 4
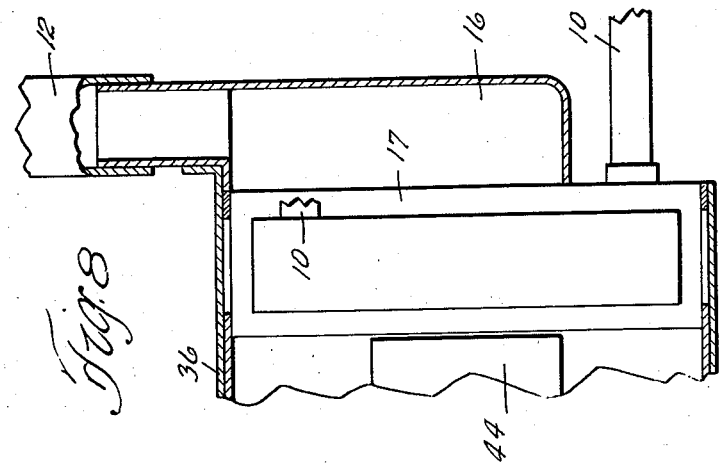
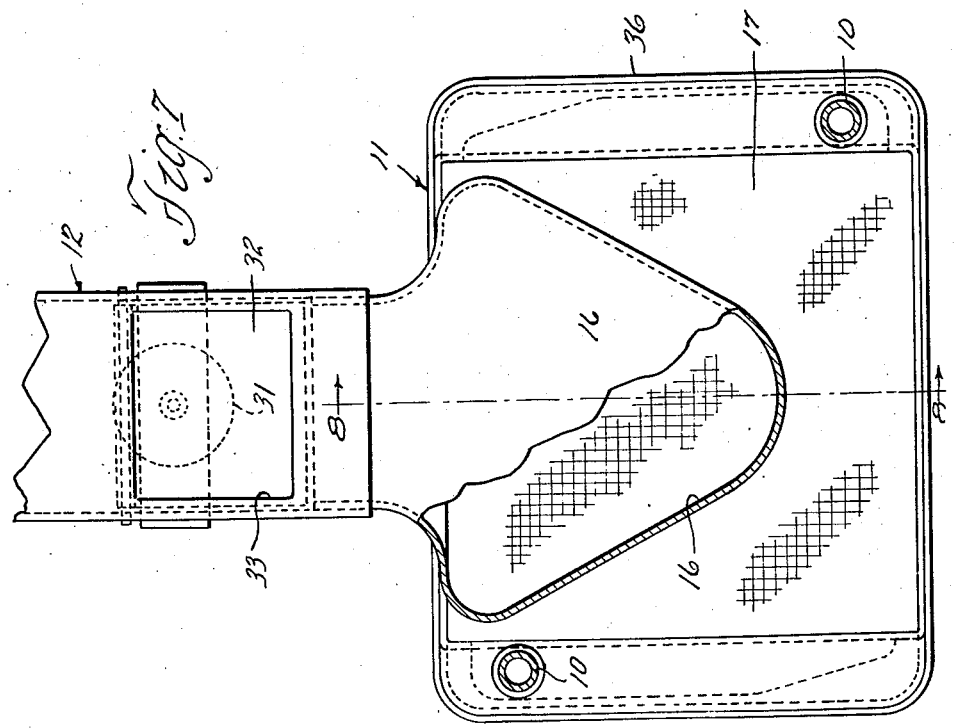
INVENTOR.
E. L. Mayo
BY Hull Brock & West
ATTORNEY.

Patented Feb. 6, 1940

2,189,348

UNITED STATES PATENT OFFICE 2,189,348

HEATING AND VENTILATING SYSTEM

Edward Levy Mayo, Cleveland, Ohio, assignor to The Bishop & Babcock Mfg. Company, Cleveland, Ohio, a corporation of Ohio Application January 6, 1938, Serial No. 183,671

1 Claim. (Cl. 257—137)

This invention relates to an automotive vehicle heater adapted to introduce fresh air into the passenger compartment of motor vehicles, but also useful for other analogous situations.

The principal object of this invention is to provide a device which is capable of heating fresh air introduced into the vehicle from the outside to the inside of the passenger compartment of the vehicle and which is capable at the same time of re-circulating the air in the compartment for further heating and reheating.

It is well known that heaters heretofore have not had sufficient capacity to heat fresh air introduced into passenger compartments of vehicles in such manner as to prevent discomfort to the passengers and it is an object of this device to deliver to the heater a sufficient quantity of fresh air to insure the most comfort to the passengers and at the same time recirculate the body of air already in the passenger compartment so as to insure a constantly moving body of air properly heated, to a comfortable degree and mixed with a constant stream of preheated fresh air.

A further object is to provide for thermostatic regulation of the amount of fresh air admitted to the passenger compartment responsive to the temparature therein.

A further object is to utilize the motion of the vehicle as an auxiliary air circulating means.

A still further object is to provide effective and novel means for circulating and recirculating the air introduced into the passenger compartment and already in the compartment in relation to the radiator of the heater whereby a simple and economical device is provided for securing the above object, and one which will not get out of order.

Figure 5:
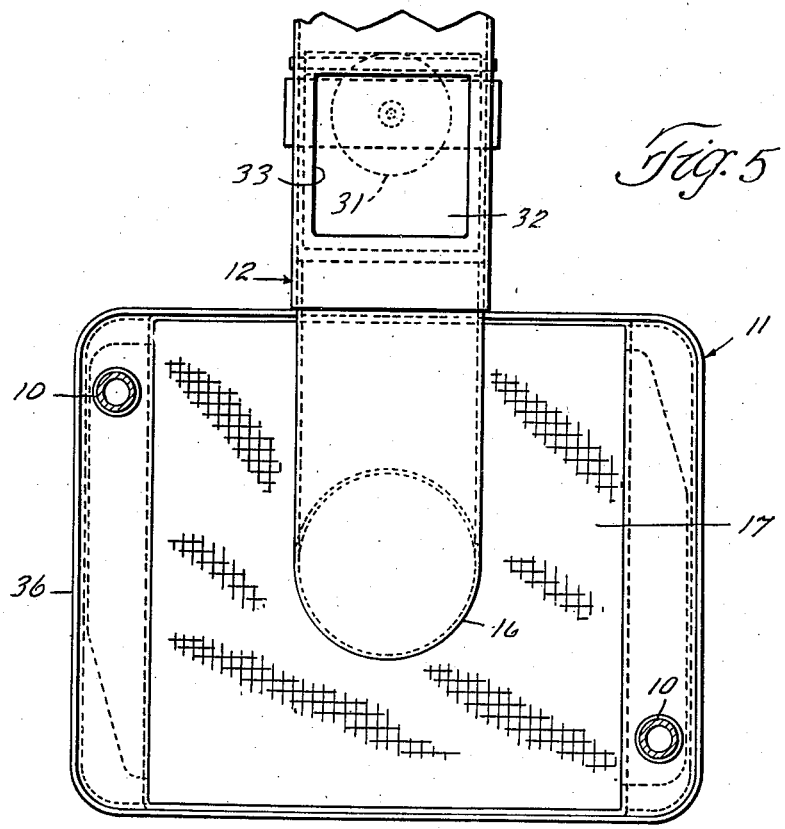
Figure 6:
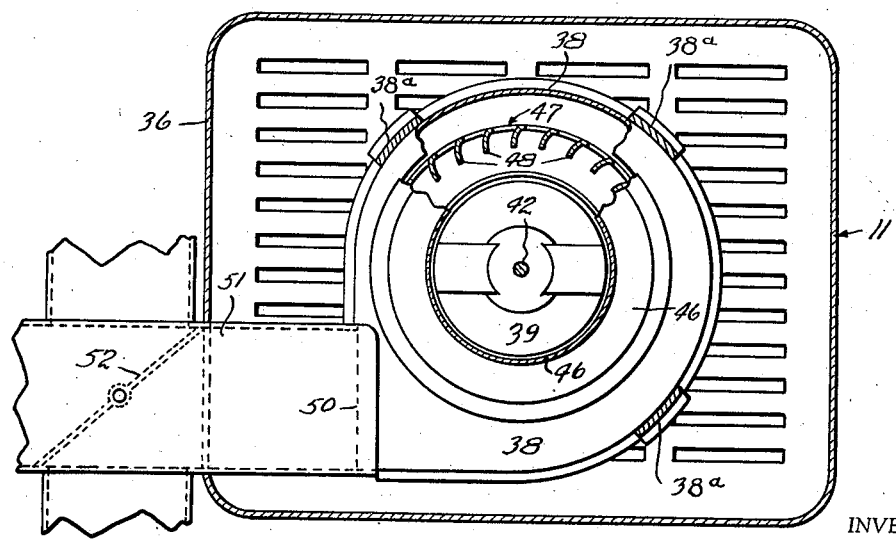

With these and other more limited objects in view, the invention consists in various features of construction and combination of parts hereinafter described and illustrated in the accompanying drawings in which Fig. 1 is a diagrammatic view of a fragment of the motor vehicle with an air conditioning device according to the invention installed; Fig. 2 is a similar diagram showing another means of supplying fresh air and showing the same structure as Fig. 1 in plan; Fig. 3 is a central vertical section of the device shown in Fig. 1, the fresh air duct and most of the vehicle being broken away; Fig. 4 is a section corresponding substantially to the line 4—4 of Fig. 3; Fig. 5 is a section corresponding substantially to the line 5—5 of Fig. 3; Fig. 6 is a section corresponding substantially to the line 6—6 of Fig. 3, parts being broken away to show the construction of the centrifugal fan, most of the conduit being omitted; Fig. 7 is a view similar to Fig. 5 showing a modification of the plenum chamber; and Fig. 8 is a fragmentary sectional view on the line 8—8 of Fig. 7.

Referring now in detail to the various parts, the numeral 1 indicates a portion of a conventional automobile having the usual partition wall 2 dividing the body into passenger compartment 3 and motor compartment 4. The hood cover 5 rests on the cowl 6. The cowl 6 supports the windshield 7 and is provided with the customary cowl ventilator opening 8 having a cover 9. Mounted on the partition wall 2 by means of the inlet and outlet pipes 10 and held in place by any convenient means, in this case washers and lock nuts being used, is the heating unit generally indicated by the numeral 11. It is understood that any convenient and suitable means of supporting the heating unit may be employed. Communicating with the heater 11 is a fresh air conduit indicated generally by the numeral 12. In Fig. 1 the duct extends upwardly and terminates under the cover 9. The duct 12 is provided with suitable baffles 13. Immediately above the lower one is a drain 14 and below the baffles is a filter 15. The duct 12 communicates at its lower end with a plenum chamber 16 which delivers air adjacent the radiator 17 of the heater 11. In Fig. 2 the duct 12 leads to an adapter 18 which is connected to the plenum chamber 16 which is, as described above, adjacent the face of the radiator 17 of the heater 11. The duct in Fig. 2 leads forward to the engine radiator 19 of the vehicle and is provided with a filter 20 and a drain 21. The vehicle engine is indicated at 22 and has a cooling fan 24 suitably attached.

The plenum chamber 16 may be of any desired shape either as shown in Fig. 5 or preferably as shown in Figs. 7 and 8, and is attached to the housing 36 and is in communication therewith. The plenum chamber in Fig. 7 covers that part of the radiator 17 which is opposite the sleeve element 44 on the opposite side of the radiator and an additional part of the radiator beyond the area covered by the sleeve 44. The plenum chamber may extend in any direction from the center area opposite the sleeve 44 as the purposes of the plenum chamber is to provide a source of fresh air to the centrifugal type fan 47 and the propeller type fan 53 and still permit the propeller type fan 53 to draw air from the passenger compartment for re-circulation.

It is obvious in both of the embodiments, Figs.

1 and 2, that the motion of the car will tend to create pressure forcing air through the ducts 12 to the heater 11 and that undesirable moisture is eliminated before the fresh air can reach the heater 11 and that filtering means 15 or 26 prevent the ingress of foreign material such as dust to the passenger compartment. It will be noted that thermostatic elements 31 are interposed between the plenum chamber 16 and the air duct 12, or as shown in Fig. 2, they may be placed in the adaptor 18. The thermostatic device operates a closure 32 shown in Fig. 3 which when in the dotted position prevents fresh air from entering the plenum chamber 16 and permits air from the car to enter the plenum chamber 16 through an opening 33 for re-circulation. The thermostats 31 are shown as exposed to the temperature of the passenger compartment and operate the closure 32 through an operative rod 34 working in a slot 35. Therefore, the admission of fresh air is thermostatically controlled responsive to the temparature in the passenger compartment which is thereby automatically maintained at a predetermined temperature.

As already indicated, the heater 11 is equipped with a radiator 17 which is equipped, with water headers of the usual type through which hot water is circulated by means of inlet and outlet pipes 10. Adjacent one face of the radiator 17 is the plenum chamber 16 which covers the center portion of the radiator and an additional portion as shown in Figs. 7 and 8. The radiator is carried by the outer shell 36 of the heater. Within the outer shell 36 and carried by brackets 38a is a housing element 38 which supports a motor 39 by means of carrying elements 40 which may be of any suitable construction. The housing 38 entirely surrounds the motor 39 and has a central opening 41 which opens toward the radiator 17. The motor 39 which may be driven either by air or electricity, has attached to its shaft 42 a fitting 43 carrying a cup shaped sleeve element 44 provided with openings 45 for the passage of air. Telescoped with the sleeve element 44 is a sheet metal flaring element 46 which carries the rotor 47 of a centrifugal type fan provided with vane elements 48. The motor shaft 42 and the elements 44, 46, 47 and 48 rotate as a unit. The sleeve element 44 terminates adjacent the radiator 17 and opposite, or in register with, the plenum chamber 16. The housing 38 has a radial outlet 50 which communicates with a fitting 51 which carries valve control means 52 which may be so constructed as to permit delivery of air to the various outlets.

Supported on the sleeve element 44 is a propeller type fan 53 preferably comprising a sheet metal flange 54 and blades 55.

It will now be seen that when the motor 39 is running, the air will be drawn by the rotor 47 operating in the housing 38 through the sleeve 44. This will cause the fresh air to be drawn from the plenum chamber 16 through the radiator 17 and the air will then be delivered by the centrifugal fan to the fitting 50 and thence to any desired place depending upon the manipulation of the valve means 52. At the same time the propeller type fan 53 will operate and draw air through the radiator 17, part of which air will be fresh air drawn from the plenum chamber 16 and part of which will be air from the passenger compartment for re-circulation as shown in Figs. 7 and 8. In the case of the device shown in the other figures the air will be drawn from the re-circulated air in the passenger compartment only. The outer shell 36 is provided with a series of outlet louvers which will permit the air drawn in by the propeller type fan 53 to escape into the passenger compartment. The passenger compartment may be provided with an outlet to relieve the pressure in case the compartment is sufficiently air tight to render that precaution necessary.

It will be seen from the foregoing that I have described a device which is well adapted for its intended purpose and while I have shown the present preferred embodiments of the invention, it is understood that I am not limited to the details of the disclosure but only in accordance with the appended claim.

Having thus described my invention, what I claim is:

In an automobile heater, a radiator, a centrifugal fan on one side of said radiator, a housing enclosing said centrifugal fan having an inlet adjacent one face of said radiator, and a radial outlet, a propeller fan located between the centrifugal fan and the radiator, a fresh air duct having an outlet adjacent the other side of said radiator opposite said centrifugal fan housing inlet and covering an additional portion of said radiator and a housing enclosing said propeller fan, said centrifugal fan and said radiator.

EDWARD LEVY MAYO.